(No Model.)
E. MORRISON.
FILTER.
No. 594,415. Patented Nov. 30, 1897.
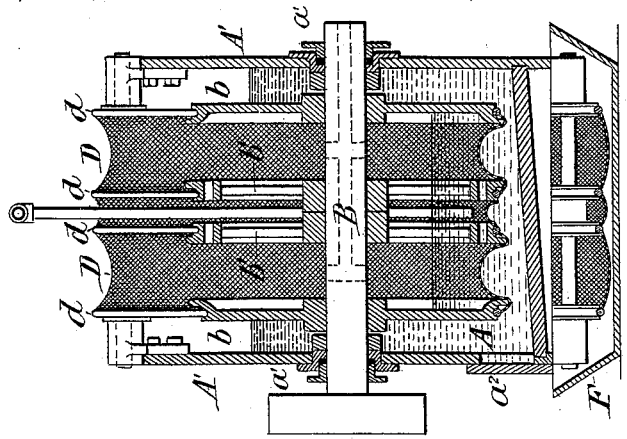
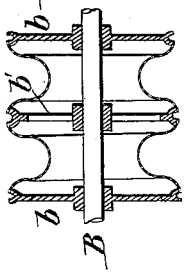
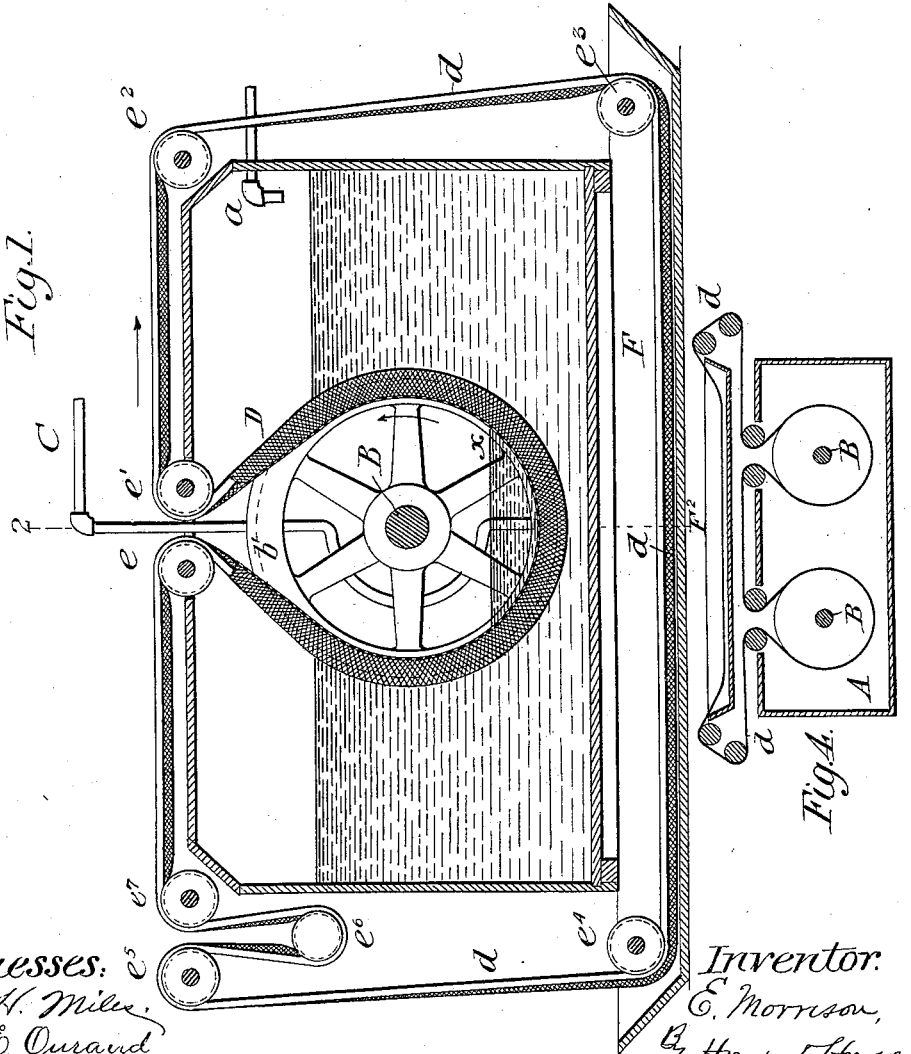
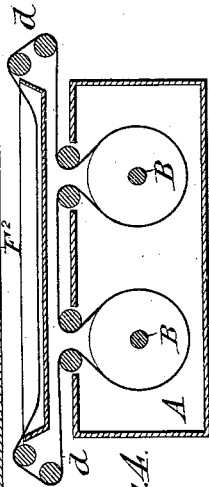
Witnesses:
M. H. Miles
M. E. Ourand
Inventor:
E. Morrison,
Howson & Howson
his attys.

UNITED STATES PATENT OFFICE.

EDWIN MORRISON, OF PHILADELPHIA, PENNSYLVANIA.

FILTER.

SPECIFICATION forming part of Letters Patent No. 594,415, dated November 30, 1897.

Application filed June 20, 1895. Serial No. 553,455. (No model.)

*To all whom it may concern:*

Be it known that I, EDWIN MORRISON, a citizen of the United States, residing at Philadelphia, Pennsylvania, have invented certain Improvements in Filters, of which the following is a specification.

My invention relates to certain improvements in filters especially used in filtering raw sugar or like materials.

The object of my invention is to so construct the filter that the filtering-cloth may be moved continuously through the machine and cleansed, so as to present a clean filtering-surface, and this object I attain in the following manner, reference being had to the accompanying drawings, in which—

Figure 1 is a longitudinal sectional view of my improved filtering apparatus. Fig. 2 is a transverse sectional view on the line 2 2, Fig. 1. Fig. 3 is a view showing the drum having a supporting-screen attached, and Fig. 4 is a view illustrating a modification.

A is the tank containing the liquor to be filtered.

$a$ is the inlet-pipe for the liquor.

B is a shaft driven in any suitable manner, and this shaft finds its bearings in the slides A' of the tank, as illustrated in Fig. 2. Suitable packing-boxes $a'$ are provided, so as to prevent the escape of the liquor from the tank through the bearings.

On the shaft B are four wheels $b\ b\ b'\ b'$. These wheels have grooved peripheries, and the central wheels $b'\ b'$ are spoke-wheels, while the outer wheels $b\ b$ are solid. These wheels form with the cloth or screen a drum.

D is a filtering-cloth, and this filtering-cloth in the present instance is attached to four cords or belts $d$. These cords are adapted to wheels $b\ b\ b'\ b'$, as shown clearly in Fig. 2. The filtering-cloth is endless in the present instance and its cords pass around suitable pulleys arranged as shown. The pulleys $e\ e'$ are carried by the upper part of the tank and are arranged at a sufficient distance apart to allow for the passage of the suction or siphon pipe C, which extends into the space between the wheels $b'\ b'$ and down to a point below the liquor-level $x$, Fig. 1. The pipe is bent in the present instance so as to clear the shaft B. After the filtering-cloth passes around the pulleys $e'$ it passes around pulleys $e^2$ and around pulleys $e^3$ in the washing-trough F, and then passes up from the trough, around pulleys $e^4$ and over pulleys $e^5$ to tension-rolls $e^6$, and then over pulleys $e^7$ to the pulleys $e$, at which point it enters the tank and passes around the wheels on the shaft B.

In the washing-trough F may be arranged suitable nozzles and wringing-rolls, so that the filtering-cloth will be thoroughly cleansed before it again enters the machine.

A manhole-opening $a^2$ in one side of the tank is provided with a suitable door, and I preferably incline the bottom of the tank toward this opening, so that when it is wished to clean the tank the liquid will flow out of the manhole-opening.

The operation of the mechanism is as follows: In some instances instead of placing the washing-trough below the tank A it may be placed above the tank, as shown in Fig. 4, or at one side, and the sweet water (when sugar is being filtered) may run back into the tank. When the shaft B is set in motion, the filtering-cloth is traversed in the direction indicated by the arrows, the tank is then charged with liquor, and as the liquor percolates through the meshes of the filtering-cloth it accumulates in the bottom of the drum (formed by the wheels $b\ b'$ and the filtering-cloth) and is removed either by a siphon or a suction pipe. The filtering-cloth passes out of an opening in the upper portion of the tank and down to the washing-trough F, where it is either agitated and squeezed so as to remove the particles that may be attached to it, or it can be subjected to the action of steam, water, or air jets. The cloth then passes out of the trough and around the tension-roll $e^6$, which can be either weighted to make the proper tension or may be arranged in suitable bearings preferably provided with springs.

Material may be constantly added to the tank through the inlet-pipe $a$, or may be fed to the tank intermittently without departing from my invention.

While my invention is especially applicable for filtering raw sugar, it can be used for any substance that is capable of being filtered in this manner.

It will be understood that while I have shown four wheels and the filtering-cloth provided with cords adapted to the wheels two wheels may be used in connection with the filtering-cloth having cords at each side, and where increased size is desired more cords may be used without departing from my invention.

The filtering-cloth may be more or less bagged, so as to increase the filtering-surface, as by looping with cross-cords or introducing intermediate wheels, and when necessary a supporting-screen may be permanently attached to the wheels $b\ b'$, forming a screen-drum, as shown in Fig. 3. This screen may be corrugated or otherwise shaped, so as to increase the filtering-surface, and may have an open section for the passage of the discharge-pipe, or the shaft may be made hollow and form the outlet.

It will be understood that the shaft and wheel may be duplicated in the tank, as shown in Fig. 4.

I claim as my invention—

1. The combination of the tank, means for charging the tank with liquid to be filtered, a shaft, wheels on said shaft, an endless filtering-apron of a greater width than the distance between the wheels so that the filtering-apron will bag in passing around the wheels in order to increase the filtering-surface, guides for the apron and a discharge-pipe entering the space formed by the wheels and the cloth so that the unfiltered material will remain in the tank, substantially as described.

2. The combination of the tank, the shaft, two or more wheels on said shaft, an endless filtering-apron consisting of a cloth and cords attached to the cloth, said cords being adapted to the wheels and guides, the guides for the apron as it passes onto and from the wheels being spaced to form an opening at the top of the tank, an inlet for the tank and a discharge-pipe extending through the opening between the guides and into the space inclosed by the wheels and filtering-cloth, substantially as described.

3. The combination of a tank, a shaft, a series of flanged wheels on said shaft, corrugated screens forming a perforated drum with annular corrugations, guides outside the tank, an endless filtering-apron adapted to pass around the perforated corrugated drum and around the guides and a discharge-pipe entering the space within the drum, substantially as described.

4. The combination of a tank, an inlet therefor, a shaft, a series of flanged wheels on said shaft, the end wheels of said series being solid, guides outside of the tank, with an endless filtering-cloth adapted to pass around the wheels and guides and a series of cords adapted to confine the cloth to the wheels and a discharge-pipe entering the space formed by the wheels and the cloth so that the unfiltered material will remain in the tank, substantially as described.

In testimony whereof I have signed my name to this specification in the presence of two subscribing witnesses.

EDWIN MORRISON.

Witnesses:
JOS. H. KLEIN,
HENRY HOWSON.